United States Patent

Tanaka et al.

Patent Number: 5,359,679
Date of Patent: Oct. 25, 1994

[54] OPTICAL MODULATOR

[75] Inventors: Hideaki Tanaka, Koganei; Masatoshi Suzuki, Kawashima; Yuichi Matsushima, Tokorozawa, all of Japan

[73] Assignee: Kokusai Denshin Denwa Kabushiki Kaisha, Tokyo, Japan

[21] Appl. No.: 72,986

[22] Filed: Jun. 4, 1993

[30] Foreign Application Priority Data

Jun. 11, 1992 [JP] Japan .................................. 4-175911

[51] Int. Cl.⁵ .............................................. G02B 6/10
[52] U.S. Cl. ............................................ 385/8; 385/2; 385/4; 385/9; 359/248; 359/245
[58] Field of Search ........................ 385/2, 3, 4, 8, 9; 359/245, 246, 248

[56] References Cited

U.S. PATENT DOCUMENTS

| | | | |
|---|---|---|---|
| 4,685,763 | 8/1987 | Tada | 385/8 |
| 4,913,506 | 4/1990 | Suzuki | 385/2 |
| 5,113,283 | 5/1992 | Sugawara | 385/2 X |
| 5,119,449 | 6/1992 | Komatsu | 385/8 |

FOREIGN PATENT DOCUMENTS

| | | | |
|---|---|---|---|
| 0256320 | 11/1986 | Japan | 385/2 |
| 0003221 | 1/1987 | Japan | 385/2 |
| 0082021 | 3/1989 | Japan | 385/2 |

Primary Examiner—Eugene R. LaRoche
Assistant Examiner—Son Mai
Attorney, Agent, or Firm—Emmanuel J. Lobato

[57] ABSTRACT

An optical modulator in which waveguide regions are disposed at opposite ends of a modulation region to reduce the capacitance of the device and prevent pn junctions from exposure to air. On an n-side electrode there are laminated a substrate, an n-type clad layer and an optical modulation waveguide layer. A modulation region lies at the center of the optical modulation waveguide layer along the direction of travel of light, and two waveguide regions are disposed at opposite ends of the modulation region, respectively. On the optical modulation waveguide layer which constitutes the modulation region there are laminated a non-doped layer, a p-type clad layer and a p-side electrode, and a semi-insulating semiconductor is formed on the optical modulation waveguide layer which forms the two waveguide regions.

3 Claims, 5 Drawing Sheets

OPTICAL MODULATOR

BACKGROUND OF THE INVENTION

The present invention relates to an optical modulator which permits ultrahigh-speed modulation.

FIG. 6 shows a conventional optical modulator. On an n-side electrode 10 there are laminated an n-type InP substrate 1, an n-type InP clad layer 2, an InGaAsP optical modulation waveguide 3, a non-doped InP clad layer 4, a p-type InP clad layer 5 and a p-type InGaAsP contact layer 6. The layers 3, 4, 5 and 6 are formed into a mesa, which is flanked by semi-insulating InP layers 7 in such a manner as to bury therein these layers. Protective silicon nitride films 8 cover the semi-insulating InP layers 7, and a p-side electrode 9 is formed in contact with the InGaAsP contact layer 6. A pad 11 is formed on the silicon nitride film 8 in a manner to be electrically connected to the p-side electrode 9.

With the optical modulator shown, it is possible to modulate incident light to the InGaAsP optical modulation waveguide layer 3 by applying a minus voltage to the p-side electrode 9 and a plus voltage to the n-side electrode 10. For example, in a case where the optical modulator is designed so that the photon energy of incident light thereto becomes smaller than the band gap energy of the InGaAsP optical modulation waveguide layer 3 by about 30 to about 60 meV, the incident light is hardly absorbed by the InGaAsP optical modulation wave-guide layer 3 and passes intact therethrough when no voltage is applied, but when voltage is applied, the incident light is mostly absorbed. By designing the modulator so that the photon energy of the incident light becomes sufficiently smaller than the band gap energy of the InGaAsP optical modulation waveguide layer 3, it is possible to modulate the incident light while keeping its intensity constant.

In the illustrated optical modulator, the capacitance of the pad 11 is 0.37 pF in a case where the semi-insulating InP layers 7, the silicon nitride film 8 and the pad 11 are, for instance, 2.25 $\mu$m thick, 0.1 $\mu$m thick and 100 $\mu$m$\phi$ thick, respectively. An optimum design of the element for its operating voltage and the insertion loss of light is such as follows: The InGaAsP optical modulation waveguide layer 3 is about 0.25 $\mu$m thick and about 2.5 $\mu$m wide, the non-doped InP clad layer 4 is about 0.05 $\mu$m thick, and the device is about 100 $\mu$m thick and 200 to 300 $\mu$m long. According to calculations by the present inventors, the capacitance between the p-side and n-side electrodes 9 and 10, except the capacitance of the pad 11, was 0.27 pF every 100 $\mu$m of the device length. Consequently, the capacitance of the device is 0.91 pF to 1.18 pF. In case of constituting the system with 50 $\Omega$ for impedance matching of a high-frequency circuit, the cut-off frequency will be lower than 10 GHz. To make the cut-off frequency higher than 10 GHz, the capacitance of the optical modulator needs to be decreased and it is well-known that this can be done by decreasing the length of the device.

Present semiconductor device manufacturing techniques have difficulty in the cleavage of both ends of an optical modulator which has a length substantially equal to or smaller than the thickness of the device itself. Therefore, in the fabrication of an optical modulator which has a thickness of around 100 $\mu$m as in the above example and a length of about 100 $\mu$m or less, the cleavage of its both end faces is difficult and the cut-off frequency of the optical modulator cannot be made higher than 10 GHz by the known method of reducing the length of the device.

Moreover, pn junctions at input and output end faces of the conventional optical modulator are exposed to air, and hence water and oxygen in the air enter into the pn junctions, adversely affecting the durability and reliability of the optical modulator.

SUMMARY OF THE INVENTION

An object of the present invention is to provide an optical modulator which has a waveguide region provided at either one of two sides of the modulation region to reduce the capacitance of the device and prevent the pn junctions from exposure to air.

The optical modulator of the present invention has a construction in which a substrate, an n-type clad layer and an optical modulation waveguide layer are laminated on an n-side electrode, a modulation region lies at the center of the optical modulation waveguide layer along the direction of travel of light, two waveguide layers lie at both ends of the modulation region in the direction of travel of light, a non-doped layer, a p-type clad layer and a p-side electrode are laminated on the optical modulation waveguide layer forming the modulation region, and a semi-insulating semiconductor is laminated on the optical modulation waveguide layer forming two waveguide regions.

In the optical modulator of the present invention, the waveguide layers provided at the front and rear ends of the modulation region form parts of the optical modulator, that is, the total length of the device, including the waveguide regions and the modulation region, is the length of the device, and by selecting the lengths of the waveguide regions such that the optical modulator is long enough to allow cleavage of its both end faces, it is possible to settle the problem of difficulty in cleavage. Furthermore, since the p-side electrode and the p-type clad layer are laminated on the modulation region alone, the effective length of the device wherein the capacitance is formed is limited only to the modulation region and hence the capacitance of the device can be reduced, as required, by arbitrarily selecting the length of the modulation region. Thus an optical modulator of a high cut-off frequency can be obtained. Besides, since the pn junctions at the input and output end faces are not exposed to air, the durability and reliability of the element are increased.

BRIEF DESCRIPTION OF THE DRAWINGS

The present invention will be described in detail below with reference to the accompanying drawings, in which.

PREFERED EMBODIMENT OF THE INVENTION

Embodiment 1

Figure 1:
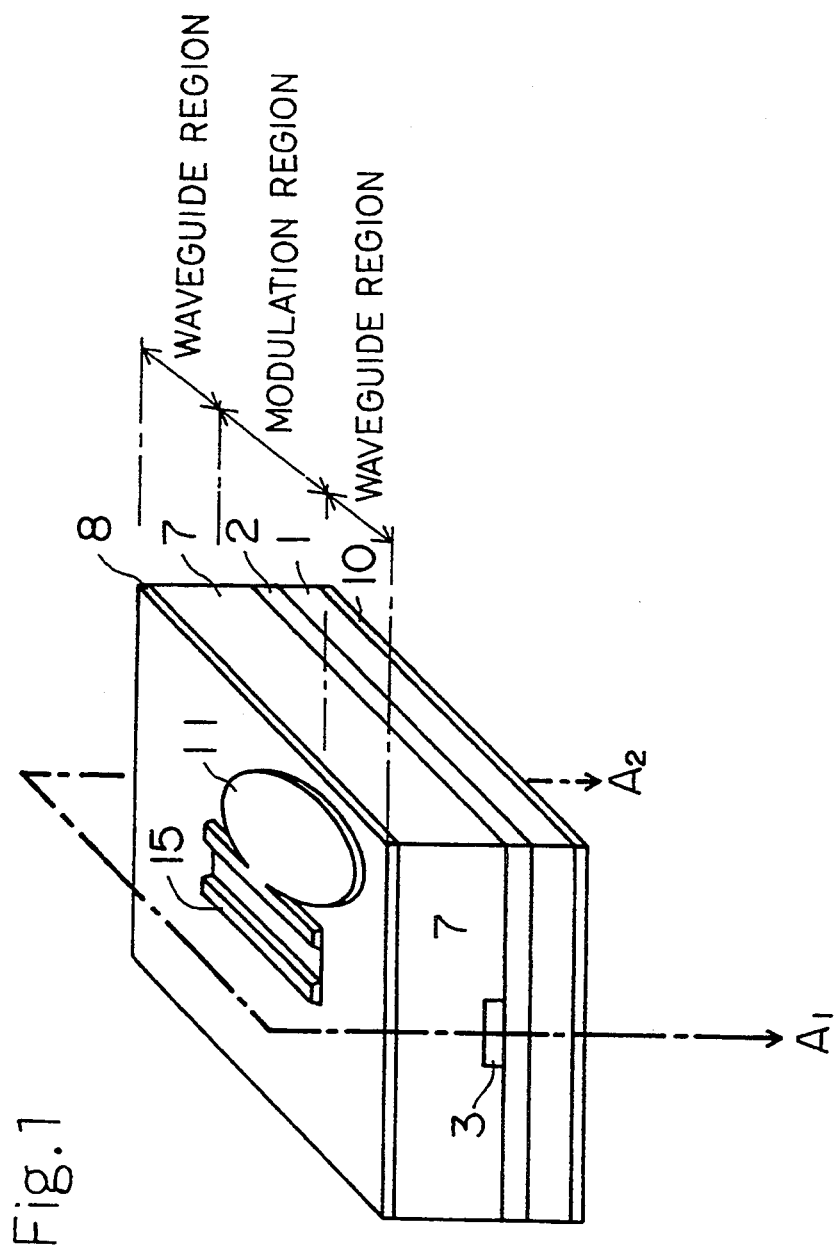
FIG. 1 is a perspective view illustrating an optical semiconductor device according to a first embodiment of the present invention.

FIG. 1 illustrates an optical modulator according to a first embodiment of the present invention. In FIG. 1 there are laminated on an n-side electrode 10 an n-type InP substrate 1, an n-type InP clad layer 2, an InGaAsP optical modulation waveguide layer 3 and an InP semi-insulating layer 7, on which there are provided a protective silicon nitride film 8, a p-side electrode 15 and a pad 11. Inside the optical modulator there are formed one on another a non-doped InP clad layer 12, a p-type clad layer 13 and a p-type InGaAsP contact layer 14, though not shown.

Figure 2:
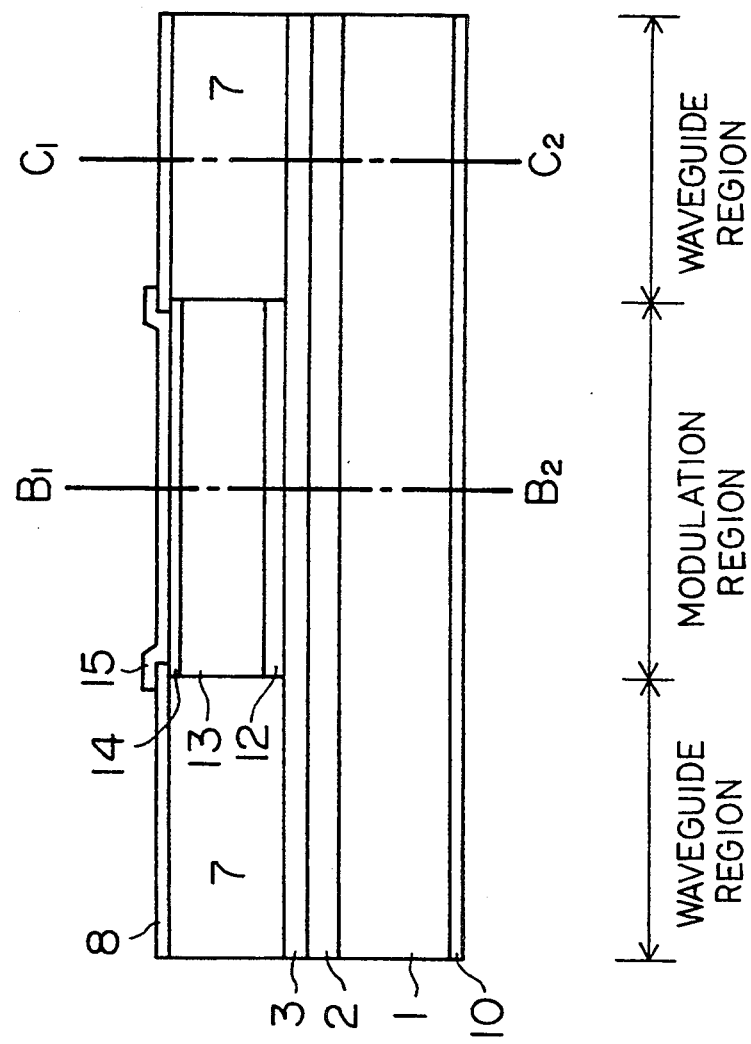
FIG. 2 is a sectional view taken on the line $A_1$–$A_2$ in FIG. 1.
Figure 3A:
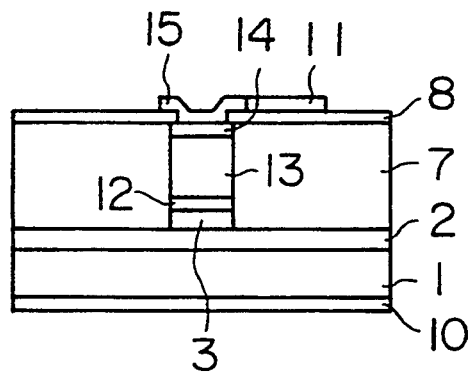
FIGS. 3A and 3B are a sectional view taken on the line $B_1$–$B_2$ in FIG. 2 and a sectional view taken on the line $C_1$–$C_2$ in FIG. 2, respectively.
Figure 3B:
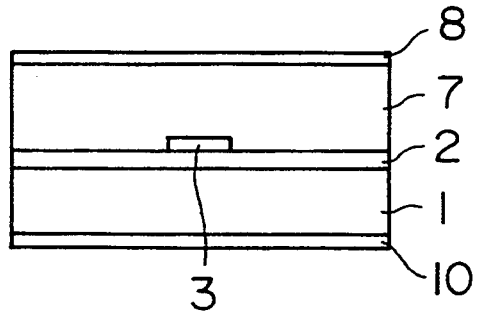

FIG. 2 is a sectional view of the optical modulator taken on the line $A_1$–$A_2$ in FIG. 1. FIGS. 3A and 3B are sectional views of the optical modulator element taken on the lines $B_1$–$B_2$ and $C_1$–$C_2$ in FIG. 2, respectively.

In FIG. 2, there are laminated on the n-side electrode 10 the n-type InP substrate 1, the n-type InP clad layer 2 and the InGaAsP optical modulation waveguide layer 3. In the region which will ultimately form a modulation region, there are laminated the non-doped InP clad layer 12, the p-type InP clad layer 13 and the p-type InGaAsP contact layer 14 so that the modulation layer lies centrally of the device and the waveguide regions lie at the front and rear ends of the modulation region. The layers 3, 12, 13 and 14 are formed into a mesa (trapezoidal and rectangular), which is surrounded by the semi-insulating InP layer 7 in such a manner as to bury therein the layers 3, 12, 13 and 14. Moreover, the protective silicon nitride film 8 covers the surface of the semi-insulating InP layer 7 and the p-side electrode 5 is formed in contact with the p-type InGaAsP contact layer 14. The pad 11 for wire bonding use is provided on the silicon nitride film 8 in a manner to make electrical connection with the p-side electrode 15.

The modulation region is 50 $\mu$m long and the waveguide regions are each 75 $\mu$m long. The thicknesses of the substrate 1, the n-type InP clad layer 2, the optical modulation waveguide layer 3, the non-doped InP clad layer 12, the p-type InP clad layer 13, the contact layer 14 and the silicon nitride film 8 are 100 $\mu$m, 0.2 $\mu$m, 0.25 $\mu$m, 0.05 $\mu$m, 2.0 $\mu$m, 0.1 $\mu$m and 0.1 $\mu$m, respectively. The layers 3, 12, 13 and 14 are 2.5 $\mu$m wide.

Only the modulation region in which the p-type InP clad layer 13 is provided has pn junctions and performs modulation. Since the modulation region is only 50 $\mu$m in length, the capacitance of the element is 0.505 pF. In case of constituting the system with 50 $\Omega$, the cut-off frequency is 12.6 GHz, permitting ultrahigh-speed modulation which is impossible with the prior art.

In addition, since the modulation region, which has the pn junctions, is surrounded by the semi-insulating InP layer 7, the pn junctions are not exposed to air; hence, the durability and reliability of the optical modulator are improved.

While in this embodiment the layers 3, 12, 13 and 14 are shown to be formed into a mesa, the effect of the present invention could .be obtained even if the n-type InP clad layer 2 is also included in the mesa and even if the n-type InP substrate 1 is also included in the mesa.

In the above embodiment the waveguide regions are disposed at the front and rear ends of the modulation region, but also in a case where such a waveguide region is provided at one end of the modulation region, the pn junction capacitance could be reduced.

Incidentally, the same applicant as that of this application has proposed a structure intended to reduce the capacitance of the pad 11 for wire bonding use in an application (Japan. Pat. Appln. No. 78778/92) entitled "Optical Semiconductor Device and its Manufacturing Method" and, by a combination of the present-invention and the abovementioned structure, an excellent effect could also be obtained.

Embodiment 2

Figure 4:
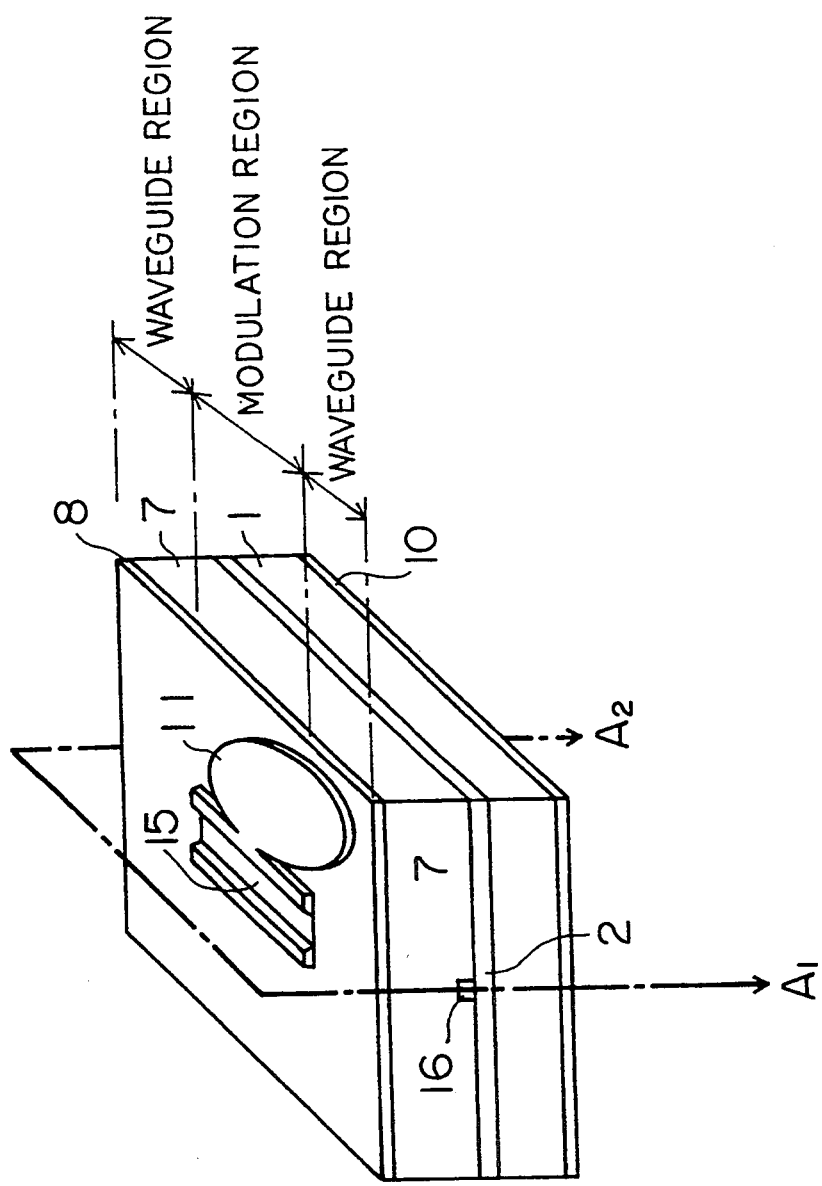
FIG. 4 is a perspective view illustrating an optical semiconductor device according to a second embodiment of the present invention.

FIG. 4 illustrates a second embodiment of the present invention. In this embodiment the optical modulation waveguide layer differs in shape from that 3 of Embodiment 1 as indicated by 16 in FIG. 4. This embodiment is identical in construction with Embodiment 1 except the above.

Figure 5:
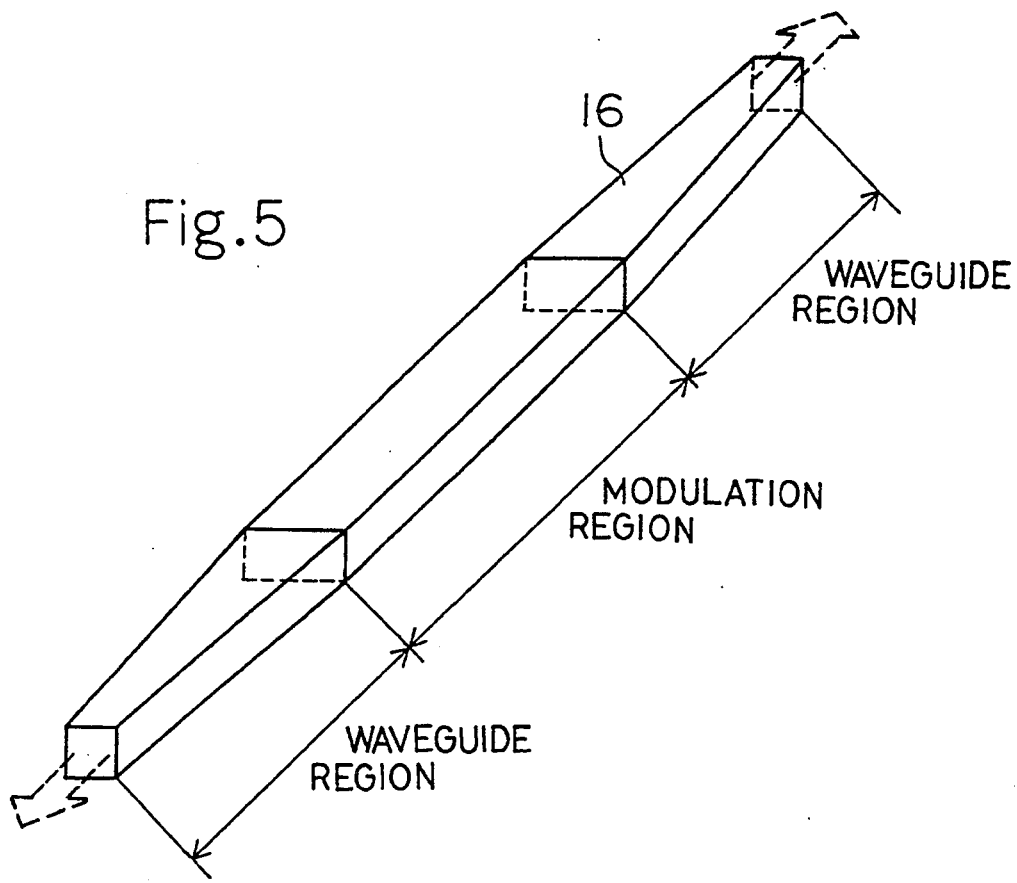
FIG. 5 is a perspective view showing the construction of an optical waveguide layer in the embodiment of FIG. 4.
Figure 6:
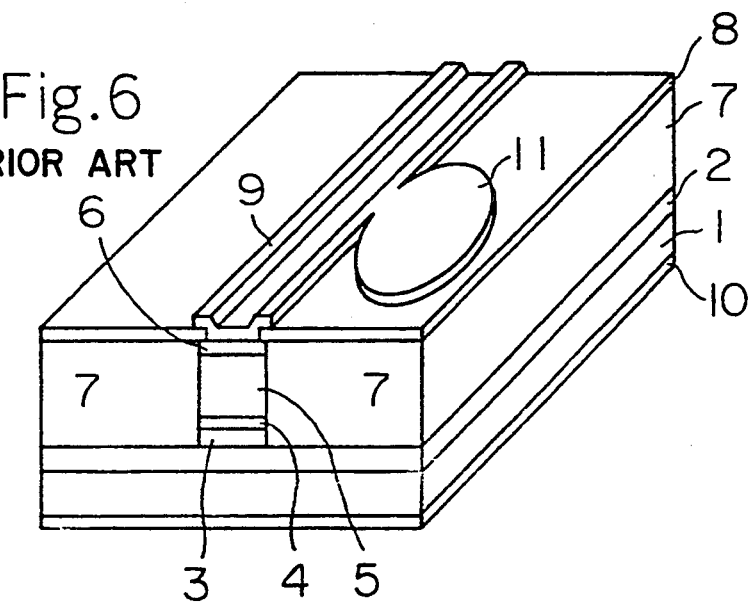
FIG. 6 is a perspective view showing a conventional optical semiconductor device.

FIG. 5 schematically shows the optical modulation waveguide layer 16 of the embodiment of FIG. 4. As depicted in FIG. 5, the end face of each optical modulation waveguide layer 16 of the waveguide region is square in cross section and this sectional configuration continuously approaches the sectional configuration of the modulation region. That is, the sectional configuration of the optical modulation waveguide layer 16 of each of the two waveguide regions continuously changes so that in a cross section of the optical modulation waveguide layer 16 of the modulation region perpendicular to the direction of travel of light (shown by dotted arrows) the thickness in the direction of lamination is smaller than the width in the direction perpendicular to the direction of lamination and that the cross section of each waveguide region perpendicular to the direction of travel of light in the optical modulation waveguide layer 16 is substantially square in one end face of the optical modulator.

As is the case with Embodiment 1, this embodiment permits ultrahigh-speed modulation. Not only the durability and reliability of the optical modulator are remarkably improved but also the optical coupling efficiency of the optical modulator and an optical fiber is substantially increased because of the construction since the optical modulator waveguide layers 16 in the input and output end faces of the device are square in cross section, the field of guided light in each of the input and output end faces becomes circular and agrees in shape with the field of light guided in the optical fiber.

Even if either one of the input and output end faces is square in cross section, the optical coupling efficiency between the square-sectioned end face and the optical fiber is high.

Since the resistivity of the non-doped InP clad layer 4 or 12, which is higher than the resistivity of any other layers forming the mesa, is approximately 1 $\Omega$cm, what is intended to mean by the term "semi-insulating layer" is a layer which has a resistivity higher than $10^5$ $\Omega$cm. In the InP crystal growth at least one of iron, cobalt and titanium is doped to make the crystal semi-insulating.

While Embodiments 1 and 2 have been described to use semiconductor materials of the InGaAsP/InP systems, the present invention is also applicable to other materials such as AlGaAs/GaAs and AlGaAs/InP systems. Further, it is also possible to employ a multiple quantum well structure formed of such materials.

Since the present invention has such a construction as described above, the following effects can be produced.

The optical modulator described in claim 1 is not limited in length, and hence permits reduction of its capacitance down to a value impossible with the prior art and allows modulation at higher speed than in the past. More over, since the pn junctions in the input and output end faces are not exposed to air, the durability and reliability of the claimed optical modulator are improved as compared with conventional optical modulators.

The optical modulator of claim 3 produces the effects obtainable with the optical modulator of claim 1 and, in addition, has a very high optical coupling efficiency between the device and the optical fiber, and hence permits substantial reduction of the insertion loss of light which occurs when light is input to the optical modulator and output therefrom.

What we claim is:

1. An optical modulator, in which a substrate, an n-type clad layer and an optical modulation waveguide layer are laminated on an n-side electrode; a modulation region disposed at the center of said optical modulation waveguide layer along a direction of travel of light; two waveguide regions disposed at front and rear ends of said modulation region along the direction of travel of light; a non-doped clad layer, a p-type clad layer and a p-side electrode disposed laminated on said optical modulation waveguide layer forming said modulation region; and a semi-insulating semiconductor formed on said optical modulation waveguide layer forming said two waveguide regions.

2. An optical modulator according to claim 1, characterized in that said optical modulation waveguide layer, said non-doped clad layer, said p-type clad layer and said p-side electrode are laminated and formed into a mesa; and said mesa is surrounded by said semi-insulating semiconductor.

3. An optical modulator according to claim 2, characterized in that in a cross section of said optical modulation waveguide layer of said modulation region perpendicular to the direction of travel of light, the thickness in the direction of lamination is smaller than the width in the direction perpendicular to the direction of lamination; and the cross-sectional configuration of said optical modulation waveguide layer of each of said two waveguide regions continuously varies so that the cross-sectional configuration of said each wavelength region perpendicular to the direction of travel of light becomes substantially square in one of opposite end faces of said optical modulator.

* * * * *